Sept. 3, 1929.   P. C. McCREADY   1,727,074

FISHING TOOL

Filed Nov. 18, 1927

Inventor

PAUL C. McCREADY,

By B. ⟨signature⟩

Attorney

Patented Sept. 3, 1929.

1,727,074

UNITED STATES PATENT OFFICE.

PAUL C. McCREADY, OF TULSA, OKLAHOMA.

FISHING TOOL.

Application filed November 18, 1927. Serial No. 234,128.

My invention relates to a fishing tool for removing sucker rods, tools and various other articles from oil wells.

The fishing tool embodies a tubular body portion, having a portion of its bore tapered. Slips or jaws are slidable within the tubular body portion and permanently free to move longitudinally thereof throughout the major portion of the length of the tubular body portion. These slips preferably have tapered portions to co-act with the tapered portion of the bore, whereby the slips are contracted as they approach the lower end of the tubular body portion. In order that one slip may not drop down lower than the other, they are permanently connected with a slidable carrier, which is permanently free to move longitudinally within the tubular body portion. The carrier is of extremely simple construction, and may be urged downwardly by a spring, although the device will operate with some degree of success without the employment of the spring. The entire device is extremely simple in construction, cheap to manufacture, strong, durable and is wholly automatic in operation.

Figure 1:
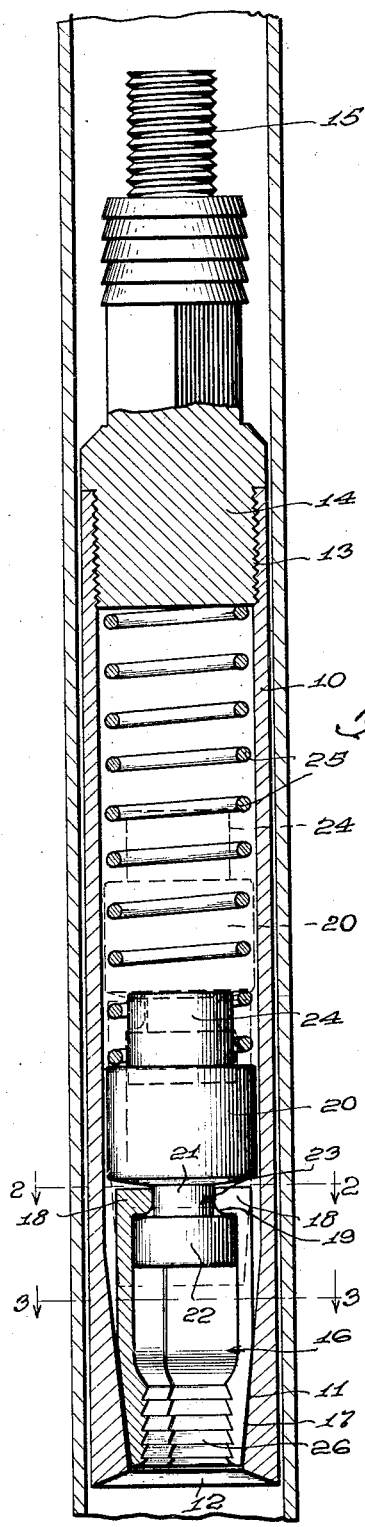
Figure 2:
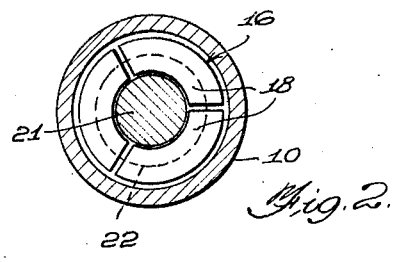
Figure 3:
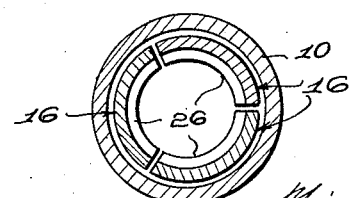
Figure 4:
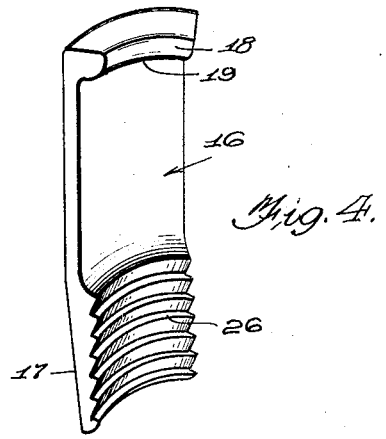

In the accompanying drawings, forming a part of this specification, and in which like numerals are employed to designate like parts throughout the same, Figure 1 is a central vertical longitudinal section through a fishing tool embodying my invention, Figure 2 is a transverse section taken on line 2—2 of Figure 1, Figure 3 is a similar view taken on line 3—3 of Figure 1, and, Figure 4 is a perspective view of one of the slips or jaws.

The fishing tool embodies a tubular body portion 10 having a bore which is cylindrical for the major portion of its length, while the lower end of the bore is tapered, as shown at 11, and decreases in diameter downwardly. At its lower end, the tubular body portion has a tapered or inclined edge 12, extending upwardly, and serving to guide a sucker rod or the like into the tapered portion 11 of the bore. The upper end of the tubular body portion 10 is screw-threaded, as shown at 13, for engagement with a screw-threaded plug 14, provided at its upper end with a screw-threaded stem 15, to engage within the lower end of a rod or the like, to which the fishing tool is attached. The socket element of the tool embodies a plurality of slips or jaws 16, three being preferably employed. The major portions of these jaws are longitudinally straight, while the lower portions of these jaws are exteriorly tapered, as shown at 17, and the tapered portions converge downwardly. These tapered portions are adapted to co-act with the tapered portion 11. The jaws 16 are provided at their upper ends with inwardly projecting flanges or shoulders 18, integral therewith and the lower edges of these flanges or shoulders are preferably rounded, as shown at 19.

The numeral 20 designates a cylindrical holder, having a substantially sliding fit within the tubular body portion 10 and movable throughout that portion of the bore of the tubular body portion which is straight. This carrier is free to move longitudinally within the tubular body portion 10, by virtue of its weight, the same being preferably formed of suitable metal. At its lower end, the carrier is provided with a stem 21, formed integral therewith and this stem carries a head 22, integral with the stem, forming a groove 23. The head 22 is of much smaller diameter than the carrier 20. The upper ends of the slips 16 surround the head 22 and the flanges or shoulders 18 project into the groove 23. When the slips 16 are assembled around the head 22, the carrier 20 projects radially beyond the slips, and hence there is a space between the slips and the tubular body portion 10, which permits of a slight tilting action of the slips on the head, so that they can properly contract and expand. At its upper end, the carrier 20 is provided with a lug 24, integral therewith, and this lug projects into the lower end of a compressible coil spring 25, the upper end of which engages the plug 14. The function of the spring 25 is to urge the carrier 20 downwardly, and while it is preferred to employ the spring, yet the device will operate with some degree of success without the spring, the carrier and slips moving downwardly by gravity. The function of the carrier is to form a loose or flexible connection between the upper ends of the slips, preventing one slip from moving downwardly beyond the other. The inner surfaces of the slips, at their lower ends, are screw-threaded, as shown at 26, so that they may have screw-threaded engagement with the screw-threaded end of the article to be removed. These screw threads are also in the form of ratchet teeth, facing upwardly and are, therefore, adapted to grip with an object not having screw threads. The portions of the screw threads upon the several slips could not properly function if one slip could move downwardly below the other. The carrier also makes it impossible for the slips to drop out of the tubular body portion.

In the operation of the fishing tool, it is lowered into the tubing, and the object to be raised, such as a sucker rod or the like, may contact with the beveled or inclined edge 12 of the tubular body portion, and be deflected inwardly thereby to a position to engage within the lower ends of the slips 16, such lower ends being at substantially the same elevation as the inclined edge 12. When the object to be raised engages with the slips they may be forced upwardly by such engagement as they are permanently free to move with the carrier 20, within the tubular body portion, and these slips will expand sufficiently so that the end of the object will engage the teeth 26 of the slips. When the object thus enters within the slips, the upward pull of the tubular body portion 10 will cause the slips to move downwardly into the tapered portion 11 and hence they will have clamping or wedging action with the object.

It is to be understood that the form of my invention, herewith shown and described, is to be taken as a preferred example of the same, and that various changes in the shape, size and arrangement of parts may be resorted to without departing from the spirit of my invention or the scope of the subjoined claim.

Having thus described my invention, I claim:—

A fishing tool of the character described, comprising a tubular body portion having a bore which has a uniform diameter throughout the major portion of its length, the lower portion of said bore tapering downwardly, the upper end of the tubular body portion being open, a carrier having a substantially sliding fit within the tubular body portion to be guided in its movement thereby, a depending reduced shank secured to the lower end of the carrier in substantial concentric relation thereto, a head secured to the lower end of the shank and having a considerably smaller diameter than the carrier and spaced vertically from the lower end of the carrier, thereby forming an annular groove, said head being spaced radially from the tubular body portion, slips arranged beneath the carrier and assembled about the head and having inwardly extending flanges to engage within the annular groove, the head having a sufficiently small diameter so that the diameter of the assembled slips when collapsed being substantially less than the diameter of the straight bore of the tubular body portion, and the flanges operating within the annular groove to effect a free pivotal connection between the slips and the carrier, said slips having tapered portions to engage with the tapered end of said bore, a plug having screw-threaded engagement within the upper end of the tubular body portion, and a compressible coil spring arranged within the tubular body portion and confined between the plug and said carrier a lug formed integral with the upper end of said carrier and projecting into the lower end of the compressible coil spring, said carrier and slips being adapted to be inserted into the tubular body portion, through the upper open end of the same.

In testimony whereof I affix my signature.

PAUL C. McCREADY.